United States Patent
Aono

(10) Patent No.: US 10,570,355 B2
(45) Date of Patent: Feb. 25, 2020

(54) CLEANING AGENT COMPOSITION FOR GLASS HARD DISK SUBSTRATE

(71) Applicant: KAO CORPORATION, Tokyo (JP)

(72) Inventor: Nobuyuki Aono, Wakayama (JP)

(73) Assignee: KAO CORPORATION, Tokyo (JP)

( * ) Notice: Subject to any disclaimer, the term of this patent is extended or adjusted under 35 U.S.C. 154(b) by 86 days.

(21) Appl. No.: 15/739,432

(22) PCT Filed: Jun. 9, 2016

(86) PCT No.: PCT/JP2016/067228
§ 371 (c)(1),
(2) Date: Dec. 22, 2017

(87) PCT Pub. No.: WO2016/208412
PCT Pub. Date: Dec. 29, 2016

(65) Prior Publication Data
US 2018/0163159 A1     Jun. 14, 2018

(30) Foreign Application Priority Data

Jun. 24, 2015   (JP) .................. 2015-126960

(51) Int. Cl.
| | | |
|---|---|---|
| C11D 3/30 | (2006.01) | |
| G11B 5/84 | (2006.01) | |
| C11D 11/00 | (2006.01) | |
| C11D 1/24 | (2006.01) | |
| C11D 3/37 | (2006.01) | |
| C11D 1/00 | (2006.01) | |

(52) U.S. Cl.
CPC .............. *C11D 3/30* (2013.01); *C11D 1/002* (2013.01); *C11D 1/24* (2013.01); *C11D 3/37* (2013.01); *C11D 11/0035* (2013.01); *C11D 11/0047* (2013.01); *G11B 5/84* (2013.01); *G11B 5/8404* (2013.01)

(58) Field of Classification Search
CPC .......... C11D 11/0035; C11D 3/30; C11D 1/22
USPC ................................. 510/163, 499
See application file for complete search history.

(56) References Cited

U.S. PATENT DOCUMENTS

| | | | |
|---|---|---|---|
| 5,262,535 A | 11/1993 | Kaiser | |
| 5,665,695 A | 9/1997 | Kaiser | |
| 2006/0079437 A1* | 4/2006 | Kondo | B29C 33/722 510/505 |
| 2015/0318017 A1 | 11/2015 | Aono et al. | |

FOREIGN PATENT DOCUMENTS

| | | |
|---|---|---|
| CN | 103694957 A | 4/2014 |
| GB | 2 273 300 A | 6/1994 |
| JP | 05-255233 A | 10/1993 |
| JP | 06-228591 A | 8/1994 |
| JP | 2004-189944 A | 7/2004 |
| JP | 2009-206481 A | 9/2009 |
| JP | 2010-086563 A | 4/2010 |
| JP | 2012-082286 A | 4/2012 |
| JP | 2012-177055 A | 9/2012 |
| JP | 2013-151677 A | 8/2013 |
| JP | 2014-111238 A | 6/2014 |
| JP | 2015-024954 A | 2/2015 |
| JP | 2015-096465 A | 5/2015 |
| JP | 2015-120817 A | 7/2015 |
| TW | 201434776 A | 9/2014 |

OTHER PUBLICATIONS

International Search Report for PCT/JP2016/067226 (PCT/ISA/210) dated Sep. 13, 2016.

* cited by examiner

*Primary Examiner* — Gregory E Webb

(74) *Attorney, Agent, or Firm* — Birch, Stewart, Kolasch & Birch, LLP

(57) ABSTRACT

A cleaning composition for a glass hard disk substrate has high detergency and can reduce the deterioration of the surface roughness of a substrate.

In an embodiment, the present disclosure relates to a cleaning composition for a glass hard disk substrate, which contains an amine (component A) expressed by the formula (I) and a surface active agent (component B) expressed by the formula (II).

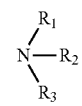

(I)

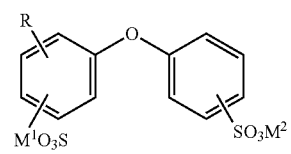

(II)

19 Claims, No Drawings

CLEANING AGENT COMPOSITION FOR GLASS HARD DISK SUBSTRATE

TECHNICAL FIELD

The present disclosure relates to a cleaning composition for a glass hard disk substrate, a method for cleaning a substrate, and a method for producing a glass hard disk substrate.

BACKGROUND ART

In recent years, personal computers and various electronic devices have been able to handle a large volume of data such as moving images and sound, and therefore mass information storage devices have been needed. Accordingly, the demand for an information recording medium with a high recording density is increasing year by year. To meet the demand, a hard disk employing a perpendicular magnetic recording system has been put into mass production. In the perpendicular magnetic recording system, a substrate for an information recording medium (also referred to as a "hard disk substrate" in the following) is required to have high levels of heat resistance and surface smoothness, as compared to the existing substrate. Further, it is more important than ever for the substrate to achieve a low specific gravity in order to reduce the load on a spindle motor, a high mechanical strength in order to prevent the crush of a disk, and high fracture toughness in order to withstand the impact of a head that may accidentally fall down.

The material used for the substrate for an information recording medium is, e.g., an aluminum alloy or glass. Recently, glass has been widely used for possible dynamic applications, since glass is superior to the aluminum alloy in both Vickers hardness and surface smoothness.

Moreover, in recent years, various recording systems have been developed to address the demand for a higher recording density (see Patent Documents 1 and 2).

Patent Documents 1 and 2 disclose a hard disk substrate for a heat-assisted magnetic recording system using a laser or the like. In this case, the hard disk substrate is an amorphous glass substrate.

Further, various cleaning compositions have also been developed to address the demand for improved surface smoothness (see Patent Documents 3 to 6).

Patent Document 3 discloses a method for cleaning a crystallized glass substrate. The method uses a cleaning agent that contains an inorganic alkali and an amine including 1 to 10 nitrogen atoms to clean polishing particles such as silica particles. Thus, the method can reduce the deterioration of the surface roughness of the crystallized glass substrate during the cleaning, and further can improve the detergency. Patent Document 4 discloses a cleaning agent for electronic materials such as a hard disk substrate. This cleaning agent contains an anionic surface active agent and an organic solvent, and is effective in removing particles without sacrificing the smoothness of the surface of a substrate. The cleaning agent also has low foaming properties and excellent stability over time. Patent Document 5 discloses a cleaning agent for electronic materials such as a magnetic disk substrate. This cleaning agent contains a sulfate ester salt, an alkali, a chelating agent, and water, and is effective in removing particles. Patent Document 6 discloses a cleaning agent for electronic materials such as a magnetic disk substrate. This cleaning agent contains a nonionic surface active agent, a high molecular type anionic surface active agent having an aromatic ring and a sulfonic group, and water. The cleaning agent has very high detergency for abrasive grains even at a high temperature.

PRIOR ART DOCUMENTS

Patent Documents

Patent Document 1: JP 2015-96465 A
Patent Document 2: JP 2015-24954 A
Patent Document 3: JP 2014-111238 A
Patent Document 4: JP 2009-206481 A
Patent Document 5: JP 2012-177055 A
Patent Document 5: JP 2013-151677 A

DISCLOSURE OF INVENTION

Problem to be Solved by the Invention

The recent increase in the recoding density of the hard disk needs more smoothness and more cleanliness of the surface of a substrate, i.e., a further reduction in the degree of contamination of the surface of a substrate due to the remaining polishing debris or abrasive grains after polishing. Particularly in the heat-assisted magnetic recording system, the substrate should have extremely high smoothness as well as heat resistance, since the substrate is heated by a laser or the like for recording. However, the cleanliness and surface roughness (smoothness) of the substrate that has been cleaned with the conventional cleaning composition are found to be insufficient because of the detergency of the cleaning composition. Moreover, the surface of a heat-resistant amorphous glass substrate, which is to be used in the heat-assisted magnetic recording system, is likely to be rough during alkaline cleaning, as compared to the conventional glass substrate. Therefore, it is difficult to achieve higher levels of cleanliness and smoothness of the substrate after cleaning.

In an aspect, the present disclosure provides a cleaning composition for a glass hard disk substrate that has high detergency and can reduce the deterioration of the surface roughness of a substrate, a method for cleaning a substrate with the cleaning composition, and a method for producing a glass hard disk substrate.

Means for Solving Problem

In one or more embodiments, the present disclosure relates to a cleaning composition for a glass hard disk substrate. The cleaning composition contains an amine (component A) expressed by the following formula (I) and a surface active agent (component B) expressed by the following formula (II).

[In the formula (I), $R_1$ represents a hydrogen atom, a methyl group, an ethyl group, or an aminoethyl group, $R_2$ represents a hydrogen atom, a hydroxyethyl group, a hydroxypropyl group, a methyl group, or an ethyl group, and $R_3$ represents an aminoethyl group, a hydroxyethyl group, or a hydroxypropyl group, or in the formula (I), $R_1$ represents a methyl group, an ethyl group, a hydroxyethyl group, or a hydroxypropyl group, and $R_2$ and $R_3$ are bonded to each other to form a pyrrolidine ring or a piperazine ring with a nitrogen atom in the formula (I).]

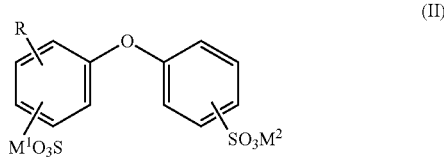
(II)

[In the formula (II), R represents a linear or branched alkyl group having 6 or more and 18 or less carbon atoms, and $M^1$ and $M^2$ each independently represent a hydrogen atom, a metal atom, $NH_4$, or organic ammonium.]

In another one or more embodiments, the present disclosure relates to a method for cleaning a substrate. The method includes a cleaning process of cleaning a substrate to be cleaned with a cleaning composition of the present disclosure. The substrate to be cleaned is a substrate that has been polished with a polishing composition.

In another one or more embodiments, the present disclosure relates to a method for producing a glass hard disk substrate. The method includes a cleaning process of cleaning a substrate to be cleaned with a cleaning composition of the present disclosure. The substrate to be cleaned is a substrate that has been polished with a polishing composition.

In another one or more embodiments, the present disclosure relates to the use of a cleaning composition of the present disclosure for a glass hard disk substrate for heat-assisted magnetic recording.

In another one or more embodiments, the present disclosure relates to a kit for producing a cleaning composition of the present disclosure. In the kit, the component A and the component B are stored so as not to be mixed with each other.

Effects of the Invention

In one or more embodiments, a cleaning composition for a glass hard disk substrate of the present disclosure has high detergency and can reduce the deterioration of the surface roughness of a substrate. In one or more embodiments, a cleaning method and a production method that use the cleaning composition of the present disclosure can provide a glass hard disk substrate with excellent surface cleanliness and smoothness after cleaning.

DESCRIPTION OF THE INVENTION

The present disclosure is based on the findings that when a glass substrate is cleaned with a cleaning composition containing a specific amine (component A) and a specific surface active agent (component B), the cleanliness of the glass substrate can be improved without deteriorating the surface roughness of the glass substrate.

In an aspect, the present disclosure relates to a cleaning composition for a glass hard disk substrate, which contains an amine (component A) expressed by the formula (I) and a surface active agent (component B) expressed by the formula (II) (also referred to as a "cleaning composition of the present disclosure" in the following).

The reason that, in one or more embodiments, the cleaning composition of the present disclosure can improve the cleanliness of the surface of the glass hard disk substrate without deteriorating the surface roughness of the substrate is still unclear in detail, but can be estimated as follows.

The component A and the component B form a complex in the cleaning composition. The adsorption force of this complex on particles (silica particles) is strong compared to the adsorption force of the individual components that are present separately in the cleaning composition. Although it is not fully clear why the complex has a larger adsorption force on silica particles than each of the components, when the complex of the components A and B is adsorbed on the surface of the silica particles, a steric barrier (steric repulsion) or an electrical barrier (charge repulsion) may be generated between the silica particles coated with the complex, so that the silica particles, which inherently tend to aggregate, may be less likely to aggregate with each other. Moreover, the dispersibility of the silica particles may be improved by the effect (action) of the steric repulsion or charge repulsion, and thus the detergency may be improved, resulting in high cleanliness of the surface of the substrate after cleaning.

The use of the amine (component A) alone may cause the substrate surface to be rough. However, the formation of the complex of the components A and B can reduce the content of the amine (component A) that is present independently in the cleaning composition. This may reduce the deterioration of the surface roughness of the substrate.

Therefore, in one or more embodiments, the cleaning composition of the present disclosure has high detergency for the glass substrate in alkaline cleaning, particularly when cleaning abrasive particles such as silica particles that remain on the surface of the substrate, and further can reduce the deterioration of the surface roughness of the substrate. Moreover, in one or more embodiments, the cleaning composition of the present disclosure can reduce the deterioration of the surface roughness of the substrate even under the conditions that the substrate to be cleaned is in contact with the cleaning composition for a long time. In one or more embodiments, the cleaning method and the production method that use the cleaning composition of the present disclosure can provide a glass substrate with excellent cleanliness and smoothness. Further, the cleaning method and the production method that use the cleaning composition of the present disclosure can reduce the deterioration of the surface roughness of the substrate due to the contact between the substrate and the cleaning composition for a long time. Therefore, even if the production line is stopped for a long period of time because of trouble in the cleaning process or other processes, the production line can be restarted once the trouble has been corrected. Moreover, the cleaning composition of the present disclosure has high detergency, and thus can shorten the cleaning time, which in turn can reduce the contact time with the substrate. Further, the cleaning composition of the present disclosure is highly effective in reducing the deterioration of the surface roughness of the substrate, and can provide a glass substrate having extremely high surface smoothness. In addition, the glass substrate that has been cleaned with the cleaning composition of the present disclosure can be used to achieve a hard disk storage device with a high recording density.

In one or more embodiments, the cleaning composition of the present disclosure is suitable for the cleaning of heat-resistant amorphous glass. A heat-resistant amorphous glass substrate is treated to have a high glass transition point and a low coefficient of thermal expansion, as compared to a general glass substrate. Therefore, the surface of the heat-resistant amorphous glass substrate is likely to be eroded by alkali. For this reason, when the heat-resistant amorphous glass substrate is cleaned with an alkaline liquid (alkaline agent) having high detergency, the surface roughness of the substrate tends to be deteriorated. Although the reason for this is not fully clear, the mechanism of surface roughening can be assumed as follows. If the alkaline agent is brought into contact with the surface of the glass substrate, some of the components in the surface of the substrate come out by, e.g., a salt exchange and go into the liquid. This may deteriorate the surface roughness of the substrate. The heat-resistant amorphous glass substrate can be significantly affected by the alkaline agent, especially because the component for enhancing the heat resistance easily comes out from the surface of the substrate.

However, in the cleaning composition of the present disclosure, the component A (amine), which serves to improve the detergency, but may deteriorate the surface roughness of the substrate, is combined with the component B (surface active agent) to form a complex, as described above. Therefore, the salt exchange or the like with some of the components in the surface of the substrate (particularly with the component for enhancing the heat resistance) may be unlikely to occur. Consequently, it is assumed that the formation of the complex will reduce the deterioration of the surface roughness of the substrate, and further improve the dispersibility of the silica particles so as to provide good detergency, as described above.

The present disclosure should not be interpreted solely based on the above mechanism.

Hereinafter, each component contained in the cleaning composition of the present disclosure will be described.

[Component A: Amine]

The component A of the cleaning composition of the present disclosure is an amine expressed by the following formula (I).

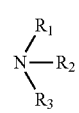

(I)

In the formula (I), $R_1$ represents a hydrogen atom, a methyl group, an ethyl group, or an aminoethyl group, $R_2$ represents a hydrogen atom, a hydroxyethyl group, a hydroxypropyl group, a methyl group, or an ethyl group, and $R_3$ represents an aminoethyl group, a hydroxyethyl group, or a hydroxypropyl group, or in the formula (I), $R_1$ represents a methyl group, an ethyl group, a hydroxyethyl group, or a hydroxypropyl group, and $R_2$ and $R_3$ are bonded to each other to form a pyrrolidine ring or a piperazine ring with a nitrogen atom in the formula W.

In one or more embodiments, examples of the component A include the following: alkanolamines such as monoethanolamine and diethanolamine, compounds obtained by the alkylation of any of the amines, and compounds obtained by the aminoalkylation of any of the amines; ethylenediamine; diethylenetriamine; and a pyrrolidine compound or piperazine compound having at least one functional group selected from the group consisting of a methyl group, an ethyl group, a hydroxyethyl group, and a hydroxypropyl group.

In one or more embodiments, from the viewpoint of improving the detergency and reducing the deterioration of the surface roughness of the substrate, the component A is preferably at least one selected from the group consisting of monoethanolamine, monoisopropanolamine, N-methyl-monoethanolamine, N-methylisopropanolamine, N-ethyl-monoethanolamine, N-ethylisopropanolamine, diethanolamine, diisopropanolamine, N-dimethylmonoethanolamine, N-dimethylmonoisopropanolamine, N-methyldiethanolamine, N-methyldiisopropanolamine, N-diethylmonoethanolamine, N-diethylmonoisopropanolamine, N-ethyldiethanolamine, N-ethyldiisopropanolamine, N-(β-aminoethyl)ethanolamine, N-(β-aminoethyl)isopropanolamine, N-(β-aminoethyl)diethanolamine, N-(β-aminoethyl)diisopropanolamine, 1-methylpiperazine, 1-(2-hydroxyethyl)pyrrolidine, 1-(2-hydroxyethyl)piperazine, ethylenediamine, and diethylenetriamine. More preferably, the component A is at least one selected from the group consisting of monoethanolamine, monoisopropanolamine, diethanolamine, N-methylmonoethanolamine, N-ethyl-monoethanolamine, N-(β-aminoethyl)ethanolamine, 1-(2-hydroxyethyl)piperazine, and diethylenetriamine. Even more preferably, the component A is at least one selected from the group consisting of monoisopropanolamine, N-methylmonoethanolamine, 1-(2-hydroxyethyl)piperazine, and N-(β-aminoethyl)ethanolamine. Further preferably, the component A is N-β-aminoethyl)ethanolamine.

From the viewpoint of detergency, the content of the component A with respect to the total mass of the components other than water in the cleaning composition of the present disclosure is preferably 40% by mass or more, more preferably 45% by mass or more, and further preferably 60% by mass or more. In this case, the content of the component A is preferably 82% by mass or less, and more preferably 80% by mass or less. From the viewpoint of reducing the deterioration of the surface roughness of the substrate, the content of the component A with respect to the total mass of the components other than water in the cleaning composition is preferably 40% by mass or more, more preferably 45% by mass or more, and further preferably 50% by mass or more. In this case, the content of the component A is preferably 90% by mass or less, more preferably 81% by mass or less, and further preferably 77% by mass or less.

From the viewpoint of detergency, the content of the component A in the cleaning composition of the present disclosure for use in cleaning is preferably 0.01% by mass or more, more preferably 0.04% by mass or more, and further preferably 0.09% by mass or more. From the viewpoint of reducing the deterioration of the surface roughness of the substrate, the content of the component A in the cleaning composition for use in cleaning is preferably 0.22% by mass or less, more preferably 0.18% by mass or less, and further preferably 0.13% by mass or less. Furthermore, from the same viewpoint, the content of the component A in the cleaning composition for use in cleaning is preferably 0.01% by mass or more and 0.22% by mass or less, more preferably 0.04% by mass or more and 0.18% by mass or less, and further preferably 0.09% by mass or more and 0.13% by mass or less.

The cleaning composition of the present disclosure may be produced as a concentrated solution, and the concentrated solution may be diluted when used for cleaning, as will be described later. In one or more embodiments, the "content of a component in the cleaning composition for use in cleaning" of the present disclosure means the amount of the component in the cleaning composition that is to be used in the cleaning process. Thus, in one or more embodiments, the cleaning composition for use in cleaning, i.e., the cleaning composition to be used in the cleaning process of the present disclosure means a diluted cleaning composition.

[Component B: Surface Active Agent]

In one or more embodiments, the component B of the cleaning composition of the present disclosure is a surface active agent (alkyl diphenyl ether disulfonic acid or its salt) expressed by the following formula (II).

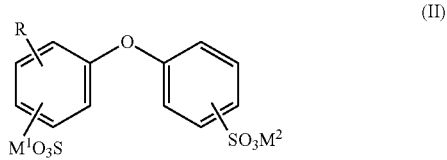

(II)

In the formula (II), in one or more embodiments, R represents an alkyl group having 6 or more and 18 or less carbon atoms, and preferably an alkyl group having 6 or more and 14 or less carbon atoms from the viewpoint of adsorption on the substrate and water solubility. In one or more embodiments, examples of the alkyl group include an octyl group, a decyl group, a dodecyl group, a tetradecyl group, a hexadecyl group, and an octadecyl group. In the present specification, the alkyl group also includes a linear alkyl group and a branched alkyl group. For example, the octyl group may include both a linear alkyl group such as n-octyl group and a branched alkyl group such as 2-ethylhexyl group.

In the formula (II), in one or more embodiment, $M^1$ and $M^2$ each independently represent a hydrogen atom, a metal atom, $NH_4$, or organic ammonium. When $M^1$ and $M^2$ represent a metal atom, in one or more embodiments, the metal atom may be alkali metal such as sodium, potassium, or lithium. Among them, sodium and potassium are more preferred from the viewpoint of dissociability. When $M^1$ and $M^2$ represent organic ammonium, in one or more embodiments, the organic ammonium may be alkanolammonium having 2 or more and 9 or less carbon atoms such as triethanolammonium or alkylammonium having 1 or more and 9 or less carbon atoms such as trimethylammonium.

In one or more embodiments, examples of the component B include disodium dodecyl diphenyl ether disulfonate and dipotassium dodecyl diphenyl ether disulfonate.

In one or more embodiments, from the viewpoint of improving the detergency and reducing the deterioration of the surface roughness of the substrate, the molecular weight of the component B is preferably 200 or more. In one or more embodiments, from the viewpoint of improving the detergency and reducing the deterioration of the surface roughness of the substrate, the molecular weight of the component B is preferably 2000 or less, and more preferably 1000 or less.

In one or more embodiments, from the viewpoint of improving the detergency and reducing the deterioration of the surface roughness of the substrate, the content of the component B with respect to the total mass of the components other than water in the cleaning composition of the present disclosure is preferably 5% by mass or more, and more preferably 10% by mass or more. In this case, the content of the component B is preferably 40% by mass or less, and more preferably 30% by mass or less. Furthermore, in one or more embodiments, from the same viewpoint, the content of the component B with respect to the total mass of the components other than water in the cleaning composition of the present disclosure is preferably 5% by mass or more and 40% by mass or less, and more preferably 10% by mass or more and 30% by mass or less.

In one or more embodiments, from the viewpoint of improving the detergency and reducing the deterioration of the surface roughness of the substrate, the content of the component B in the cleaning composition of the present disclosure for use in cleaning is preferably 0.008% by mass or more, more preferably 0.01% by mass or more, and further preferably 0.02% by mass or more. In one or more embodiments, from the viewpoint of suppressing foaming, the content of the component B in the cleaning composition of the present disclosure for use in cleaning is preferably 0.2% by mass or less, more preferably 0.1% by mass or less, and further preferably 0.08% by mass or less. Furthermore, in one or more embodiments, from the same viewpoint, the content of the component B in the cleaning composition of the present disclosure for use in cleaning is preferably 0.008% by mass or more and 0.2% by mass or less, more preferably 0.01% by mass or more and 0.1% by mass or less, and further preferably 0.02% by mass or more and 0.08% by mass or less.

From the viewpoint of detergency, the mass ratio A/B of the component A to the component B in the cleaning composition of the present disclosure is preferably 1 or more, more preferably 2.5 or more, and further preferably 5 or more. In this case, from the same viewpoint, the mass ratio A/B is preferably 20 or less, more preferably 16 or less, and further preferably 10 or less.

[Component C: Water]

In one or more embodiments, the cleaning composition of the present disclosure may further contain water (component C). The water is not particularly limited, and may be any water that can serve as a solvent. Examples of the water include ultrapure water, pure water, ion exchanged water, and distilled water. Among them, ultrapure water, pure water, or ion exchanged water is preferred, and ultrapure water is more preferred. The pure water and the ultrapure water can be obtained in the following manner. For example, tap water is subjected to an activated carbon treatment, an ion exchange treatment, and then distillation. The resulting water is irradiated with a predetermined ultraviolet germicidal lamp or passed through a filter as needed.

When the cleaning composition of the present disclosure is produced as a concentrated solution, the content of the component C in the concentrated solution is preferably 40% by mass or more, more preferably 50% by mass or more, and further preferably 60% by mass or more from the viewpoint of preservation stability. In this case, the content of component C is preferably 95% by mass or less, more preferably 93% by mass or less, and further preferably 90% by mass or less from the same viewpoint.

In one or more embodiments, from the viewpoint of improving the detergency and reducing the deterioration of the surface roughness of the substrate, the content of the component C in the cleaning composition of the present disclosure for use in cleaning is preferably 90% by mass or more, more preferably 93% by mass or more, and further preferably 95% by mass or more. In this case, from the same viewpoint, the content of the component C in the cleaning composition of the present disclosure for use in cleaning is preferably 99.9% by mass or less, more preferably 99.85% by mass or less, and further preferably 99.8% by mass or less.

[Component D: Chelating Agent]

The cleaning composition of the present disclosure may contain a chelating agent (component D) from the viewpoint of improving the detergency. In one or more embodiments, the chelating agent may be at least one selected from the group consisting of aldonic acids such as gluconic acid and glucoheptonic acid, aminocarboxylic acids such as ethylenediaminetetraacetic acid and diethylenetriaminepentaacetic acid, hydroxycarboxylic acids such as citric acid and malic acid, phosphoric acids such as 1-hydroxyethylidene-1,1-diphosphonic acid, and salts thereof. Among them, from the viewpoint of improving the detergency, the chelating agent is preferably at least one selected from the group consisting of sodium gluconate, sodium glucoheptonate, sodium ethylenediaminetetraacetate, sodium citrate, and 1-hydroxyethylidene-1,1-diphosphonic acid, and more preferably 1-hydroxyethylidene-1,1-diphosphonic acid (HEDP). These chelating agents may be used individually or in combinations of two or more.

In one or more embodiments, from the viewpoint of detergency, the content of the component D with respect to the total mass of the components other than water in the cleaning composition of the present disclosure is preferably 1% by mass or more, and more preferably 4% by mass or more. In one or more embodiments, from the viewpoint of reducing the deterioration of the surface roughness of the substrate, the content of the component D with respect to the total mass of the components other than water in the cleaning composition of the present disclosure is preferably 20% by mass or less, and more preferably 15% by mass or less. Furthermore, in one or more embodiments, from the same viewpoint, the content of the component D with respect to the total mass of the components other than water in the cleaning composition of the present disclosure is preferably 1% by mass or more and 20% by mass or less, and more preferably 4% by mass or more and 15% by mass or less.

In one or more embodiments, from the viewpoint of detergency, the content of the component D in the cleaning composition of the present disclosure for use in cleaning is preferably 0.005% by mass or more, more preferably 0.008% by mass or more, and further preferably 0.01% by mass or more. In one or more embodiments, from the same viewpoint, the content of the component D in the cleaning composition of the present disclosure for use in cleaning is preferably 1.0% by mass or less, and more preferably 0.1% by mass or less. Furthermore, in one or more embodiments, from the same viewpoint, the content of the component D in the cleaning composition of the present disclosure for use in cleaning is preferably 0.005% by mass or more and 1.0% by mass or less, more preferably 0.008% by mass or more and 0.1% by mass or less, and further preferably 0.01% by mass or more and 0.1% by mass or less.

[Component E: Anionic Polymer]

The cleaning composition of the present disclosure may contain an anionic polymer (component E) such as a carboxylic acid polymer from the viewpoint of improving the detergency. The carboxylic acid polymer may be, e.g., an anionic polymer including a methacrylic acid or an acrylic acid as a constitutional unit such as an acrylic acid polymer, a methacrylic acid polymer, a maleic acid polymer, an acrylic acid/methacrylic acid copolymer, an acrylic acid/maleic acid copolymer, or a methacrylic acid/acrylic acid methyl ester copolymer. The anionic polymer is preferably a copolymer (AA/AMPS) of acrylic acid (AA) and 2-acrylamide-2-methylpropanesulfonic acid (AMPS), and more preferably a copolymer in which the molar ratio of AA to AMPS is 91/9 or more and 95/5 or less. Apart or the whole of the anionic portion of the anionic polymer can form a salt with alkali metal or amine. The anionic polymer is preferably a salt of the component A (amine) from the viewpoint of improving the detergency and reducing the deterioration of the surface roughness of the substrate.

From the viewpoint of improving the detergency, the content of the component E with respect to the total mass of the components other than water in the cleaning composition of the present disclosure is preferably 1% by mass or more, more preferably 3% by mass or more, and further preferably 5% by mass or more. In this case, the content of the component E is preferably 20% by mass or less, more preferably 15% by mass or less, and further preferably 10% by mass or less.

From the viewpoint of improving the detergency, the content of the component E in the cleaning composition of the present disclosure for use in cleaning is preferably 0.005% by mass or more, more preferably 0.008% by mass or more, and further preferably 0.01% by mass or more. In this case, the content of the component E is preferably 2% by mass or less, more preferably 1% by mass or less, and further preferably 0.5% by mass or less.

[Other Components]

The cleaning composition of the present disclosure may contain an optional component in place of water other than the components A to E. Examples of the optional component include an alkali metal hydroxide, a nonionic surface active agent, a solubilizer, an antioxidant, an antiseptic, an antifoaming agent, and an antimicrobial agent. In one or more embodiments, the content of the optional component in the cleaning composition is determined so that the pH of the cleaning composition for use in cleaning falls in the range, as will be described later.

The cleaning composition of the present disclosure may further contain an aqueous solvent (e.g., alcohol such as ethanol) in addition to the water as a solvent. However, it is preferable that the solvent contained in the cleaning composition of the present disclosure is composed of only water.

In one or more embodiment, from the viewpoint of improving the detergency and adjusting the pH, the cleaning composition of the present disclosure may contain at least one alkali metal hydroxide selected from the group consisting of sodium hydroxide and potassium hydroxide.

The cleaning composition of the present disclosure may contain a nonionic surface active agent from the viewpoint of improving the detergency. The nonionic surface active agent may be, e.g., polyalkylene glycol alkyl ether.

The cleaning composition of the present disclosure preferably contains at least one compound selected from the group consisting of p-toluenesulfonic acid, dimethylbenzenesulfonic acid, 2-ethylhexanoic acid, and salts thereof from the viewpoint of improving the preservation stability.

[Alkali Metal Ion Concentration]

From the viewpoint of improving the detergency and reducing the deterioration of the surface roughness of the substrate, the concentration of alkali metal ions, i.e., the total concentration of sodium ions and potassium ions in the cleaning composition of the present disclosure for use in cleaning is preferably 1% by mass (10000 ppm) or less, more preferably 0.1% by mass (1000 ppm) or less, and further preferably 0.01% by mass (100 ppm) or less. The concentration of the alkali metal ions can be determined by a measuring method, as will be described in Examples.

[pH of Cleaning Composition]

In one or more embodiments, from the viewpoint of improving the detergency and reducing the deterioration of the surface roughness of the substrate, the pH of the cleaning composition of the present disclosure for use in cleaning is preferably 9.0 or more, more preferably 9.3 or more, and further preferably 9.5 or more. In this case, from the same viewpoint, the pH of the cleaning composition of the present disclosure for use in cleaning is preferably 14.0 or less, more preferably 12.0 or less, and further preferably 11.0 or less. In one or more embodiments, from the viewpoint of improving the detergency, the pH of the cleaning composition of the present disclosure can be adjusted by using organic ammonium in combination with an alkali metal hydroxide. Moreover, from the viewpoint of reducing the deterioration of the surface roughness of the substrate, it is preferable that the pH is adjusted by using the component A and acids of the component D.

The "pH for use in cleaning" of the present disclosure means a pH of the cleaning composition when it is used at 25° C. (after dilution). The pH can be measured by a pH meter (HM-30G, manufactured by DKK-TOA CORPORATION) after a 3-minutes immersion of the electrode in the cleaning composition.

[Method for Preparing Cleaning Composition]

The cleaning composition of the present disclosure can be prepared by mixing the components. In one or more embodiments, from the viewpoint of storage and transport, the cleaning composition of the present disclosure may be produced as a concentrated solution, and the concentrated solution may be diluted at the time of use. When the concentrated solution of the cleaning composition is diluted, the dilution ratio is not particularly limited, and can be appropriately determined in accordance with, e.g., the concentration of each component in the concentrated solution and the cleaning conditions. In one or more embodiments, from the viewpoint of improving the detergency and the smoothness of the surface of the substrate after cleaning, the concentrated solution of the cleaning composition of the present disclosure is diluted preferably to 10% by mass or less, and more preferably to 5% by mass or less. In this case, from the viewpoint of improving the detergency, the concentrated solution of the cleaning composition of the present disclosure is diluted preferably to 0.005% by mass or more, and more preferably to 0.3% by mass or more.

[Concentrated Solution of Cleaning Composition]

The concentrated solution of the polishing composition of the present disclosure can be prepared by mixing the components. The content of each component other than water in the concentrated solution of the cleaning composition of the present disclosure is the same as that in the cleaning composition of the present disclosure.

From the viewpoint of detergency after dilution, the pH of the concentrated solution of the cleaning composition of the present disclosure is preferably 9.0 or more, more preferably 9.5 or more, and further preferably 10.0 or more. In this case, from the viewpoint of reducing the deterioration of the surface roughness of the substrate, the pH of the concentrated solution of the cleaning composition of the present disclosure is preferably 14.0 or less, more preferably 13.0 or less, and further preferably 12.0 or less. The pH of the concentrated solution of the cleaning composition of the present disclosure can be measured in the same manner as the pH of the cleaning composition of the present disclosure.

[Substrate to be Cleaned]

In one or more embodiments, the substrate to be cleaned (i.e., the object to be cleaned) with the cleaning composition of the present disclosure is a substrate that has been polished with a polishing composition, and is used in the production of a hard disk substrate. In one or more embodiments, the substrate to be cleaned is preferably an amorphous glass substrate, and more preferably a heat-resistant amorphous glass substrate. In one or more embodiments, the material of the glass substrate may be, e.g., aluminosilicate glass, soda lime glass, or boro-silicate glass, and is preferably aluminosilicate glass from the viewpoint of surface smoothness and substrate strength. In one or more embodiments, the substrate to be cleaned is a substrate that has been polished with a polishing composition containing abrasive grains. In one or more embodiments, the abrasive grains are silica particles. In one or more embodiments, the substrate to be cleaned is a magnetic disk substrate for heat-assisted magnetic recording. In one or more embodiments, the substrate to be cleaned is used as a glass hard disk substrate for heat-assisted magnetic recording. In other words, in one or more embodiments, the cleaning composition of the present disclosure may be used for the glass hard disk substrate for heat-assisted magnetic recording. When the cleaning composition of the present disclosure is used for the glass hard disk substrate for heat-assisted magnetic recording, it may be used in the production of the glass hard disk substrate or in the cleaning process of the substrate that has been polished with a polishing composition.

The heat-resistant amorphous glass substrate of the present disclosure means an amorphous glass substrate with a high glass transition temperature. In one or more embodiments, from the viewpoint of maintaining the smoothness of the surface of the substrate before and after heat-assisted magnetic recording, the glass transition temperature of the heat-resistant amorphous glass substrate is preferably 600° C. or more, more preferably 610° C. or more, even more preferably 620° C. or more, still more preferably 630° C. or more, and further preferably 640° C. or more. The upper limit of the glass transition temperature is not particularly limited. In one or more embodiments, the glass transition temperature is preferably 750° C. or less, and more preferably 710° C. or less.

[Method for Cleaning Substrate]

In an aspect, the present disclosure relates to a method for cleaning a substrate, which includes a cleaning process of cleaning a substrate to be cleaned with a cleaning composition of the present disclosure (also referred to as a "cleaning method of the present disclosure" in the following). In one or more embodiments, the cleaning method of the present disclosure may further include a dilution process of diluting a concentrated solution of the cleaning composition of the present disclosure. The substrate to be cleaned may be any of the above substrates. In one or more embodiments, the cleaning process includes immersion cleaning and/or scrub cleaning.

(Immersion Cleaning)

The immersion conditions of the substrate to be cleaned in the cleaning composition are not particularly limited. In one or more embodiments, from the viewpoint of workability and operability, the temperature of the cleaning composition is preferably 20° C. or more and 100° C. or less. From the viewpoint of improving the detergency of the cleaning composition, the immersion time is preferably 5 seconds or more, more preferably 10 seconds or more, and further preferably 100 seconds or more. In this case, from the viewpoint of improving the production efficiency of the cleaned substrate, the immersion time is preferably 30 minutes or less, more preferably 10 minutes or less, and further preferably 5 minutes or less. Moreover, from the viewpoint of improving the removal and dispersion of residues, it is preferable that ultrasonic vibrations are applied to the cleaning composition. The ultrasonic frequency is preferably 20 kHz or more and 2000 kHz or less, more preferably 40 kHz or more and 2000 kHz or less, and further preferably 40 kHz or more and 1500 kHz or less.

(Scrub Cleaning)

In one or more embodiments, from the viewpoint of promoting the removal of residues such as abrasive grains and increasing the solubility of oil, a scrub cleaning method preferably includes cleaning the surface of a substrate to be cleaned (i) by injecting the cleaning composition to be in contact with the surface of the substrate while ultrasonic vibrations are being applied to the cleaning composition, or (ii) by injecting the cleaning composition to be supplied to the surface of the substrate, and scrubbing the surface of the substrate on which the cleaning composition is present with a cleaning brush. Furthermore, in one or more embodiments, from the same viewpoint, the scrub cleaning method preferably includes cleaning the surface of an object to be cleaned by injecting the cleaning composition to be supplied to the surface of the object while ultrasonic vibrations are being applied to the cleaning composition, and scrubbing the surface of the object on which the cleaning composition is present with a cleaning brush.

A means for supplying the cleaning composition to the surface of the substrate to be cleaned may be, e.g., a spray nozzle. The cleaning brush is not particularly limited, and may be, e.g., a nylon brush or a PVA (polyvinyl alcohol) sponge brush. The ultrasonic frequency may be the same as that preferably used in the immersion cleaning.

In another one or more embodiments, the cleaning method of the present disclosure may include at least one step using known cleaning such as swing cleaning, cleaning with the use of rotation of, e.g. a spinner, or puddle cleaning, in addition to the immersion cleaning and/or the scrub cleaning.

In the cleaning method of the present disclosure, a plurality of substrates to be cleaned may be cleaned either one by one or simultaneously. Moreover, the cleaning process may use either a single cleaning tank or a plurality of cleaning tanks.

Hereinafter, one or more non-limiting embodiments of the cleaning method of the present disclosure will be described.

(1) Cleaning-1: A cleaning composition of the present disclosure is placed in a cleaning tank (a), and the cleaning tank (a) is set to a predetermined temperature. Then, a substrate to be cleaned is immersed in the cleaning composition in the cleaning tank (a), and cleaned while ultrasonic waves are being applied to the cleaning composition.

(2) Rinsing-1: A rising tank (b) containing ultrapure water is set to a predetermined temperature. Then, the substrate to be cleaned is transferred from the cleaning tank (a) to the rinsing tank (b), immersed in the ultrapure water in the rinsing tank (b), and rinsed while ultrasonic waves are being applied to the ultrapure water.

(3) Using a cleaning tank (c) containing a cleaning composition of the present disclosure and a rinsing tank (d) containing ultrapure water, the steps (1) and (2) are repeated again.

(4) Cleaning-2: The substrate to be cleaned in the rinsing tank (d) is transferred to a scrub cleaning unit (A) in which cleaning brushes are mounted. Then, a cleaning composition of the present disclosure is injected into each of the cleaning brushes, and the cleaning brushes are rotatably pressed against both surfaces of the substrate in the presence of the cleaning composition so that the substrate is cleaned.

(5) Rinsing-2: The substrate to be cleaned is transferred to a scrub cleaning unit (B) in which cleaning brushes are mounted. Then, ultrapure water is injected, and the cleaning brushes are rotatably pressed against both surfaces of the substrate in the same manner as the step (4) so that the substrate is rinsed.

(6) A scrub cleaning unit (C) is prepared under the same conditions as the scrub cleaning unit (A), and a scrub cleaning unit (D) is prepared under the same conditions as the scrub cleaning unit (B). Using the scrub cleaning units (C) and (D), the steps (4) and (5) are repeated again.

(7) Rinsing-3: The substrate to be cleaned is transferred to a rinsing tank (e) containing ultrapure water, immersed in the ultrapure water in the rinsing tank (e), and rinsed while ultrasonic waves are being applied to the ultrapure water.

(8) Drying: The substrate to be cleaned is transferred to a rinsing tank (f) containing hot ultrapure water (hot pure water) and immersed in the hot pure water. Then, the substrate is drawn up from the water at a predetermined rate, and the surface of the substrate is completely dried.

[Method for Producing Hard Disk Substrate]

In an aspect, the present disclosure relates to a method for producing a hard disk substrate, which includes a cleaning process of cleaning a substrate to be cleaned with a cleaning composition of the present disclosure (also referred to as a "production method of the present disclosure" in the following). The substrate to be cleaned may be any of the above substrates. In one or more embodiments, the production method of the present disclosure is preferably a method for producing a glass hard disk substrate. In one of more embodiments, the glass hard disk substrate is a substrate for heat-assisted magnetic recording.

In general, a base material for a hard disk substrate is subjected to, e.g., a shape machining process, a rough grinding process, a fine grinding process, a rough polishing process, and a final polishing process, and thus can be formed into a hard disk substrate. In some cases, a cleaning process is performed between each of the processes. The hard disk substrate may undergo a recording portion forming process after the final cleaning process, thereby providing a magnetic hard disk.

In one or more embodiments, the recording portion forming process includes forming a magnetic layer on the hard disk substrate by, e.g., sputtering. The magnetic layer has a magnetic recording area and includes a metal thin film. Examples of metal materials for the metal thin film include an alloy of cobalt and at least one selected from chromium, tantalum, and platinum, and an alloy of iron and platinum. The magnetic layer may be formed on both or one of the principal surfaces of the hard disk substrate.

In one or more embodiment, the rough polishing process and the final polishing process are performed in this order. A polishing composition used in the rough polishing process contains inorganic fine particles. The inorganic fine particles are preferably cerium oxide particles or alumina particles because they allow the substrate to be polished at high speed. A polishing composition used in the final polishing process contains inorganic fine particles. In this case, the inorganic particles are preferably silica particles because they can improve the surface smoothness (surface roughness).

After the rough polishing process, a cleaning process using the cleaning composition (the first cleaning process), a rinsing process (the first rinsing process), a drying process (the first drying process), a final polishing process, a cleaning process using the cleaning composition (the second cleaning process), a rinsing process (the second rinsing process), and a drying process (the second drying process) may be performed in this order. The cleaning method of the present disclosure can be applied to the first cleaning process and/or the second cleaning process. In one or more non-limiting embodiments, the cleaning method of the present disclosure is preferably used in the second cleaning process from the viewpoint of improving the detergency.

Therefore, in an aspect, the present disclosure relates to a method for producing a hard disk substrate, which includes the following steps (1) and (2):

(1) a polishing process of polishing a substrate to be polished with a polishing composition; and (2) a cleaning process of cleaning the substrate obtained by the step (1) (i.e., the substrate to be cleaned) with the cleaning composition of the present disclosure.

The substrate to be polished in the step (1) is generally the substrate after the fine grinding process, and preferably the substrate after the rough polishing process. The substrate to be polished may be any of the above substrates used as the substrate to be cleaned. The step (1) can be performed by, e.g., supplying the polishing composition to a polishing surface of the substrate to be polished, bringing a polishing pad into contact with the polishing surface, and moving the polishing pad or the substrate while applying a predetermined pressure (load). The step (1) is preferably the final polishing process using the polishing composition containing silica particles from the viewpoint of improving the quality of the final substrate. In the final polishing process, it is preferable that the polishing composition is used repeatedly.

The cleaning process in the step (2) may be performed in the same manner as the cleaning method of the present disclosure.

[Hard Disk Storage Device]

In an aspect, the present disclosure relates to a hard disk storage device using a glass hard disk substrate that has been cleaned with a cleaning composition of the present disclosure (also referred to as a "hard disk storage device of the present disclosure" in the following). The use of the hard disk substrate that has been cleaned with the cleaning composition of the present disclosure can provide a hard disk storage device with a high recording density. In one or more embodiments, the recording system may be, e.g., a heat-assisted magnetic recording system.

[Kit]

In an aspect, the present disclosure relates to a kit for producing a cleaning composition of the present disclosure, in which a component A and a component B are stored so as not to be mixed with each other (also referred to as a "kit of the present disclosure" in the following).

In the kit of the present disclosure, e.g., a solution containing the component A (first solution) and a solution containing the component B (second solution) are stored so as not to be mixed with each other, and the first solution and the second solution are mixed at the time of use. Each of the first solution and the second solution may contain the components C to E and the optional component as needed.

The kit of the present disclosure can provide a cleaning composition that has high detergency and can reduce the deterioration of the surface roughness of a substrate after cleaning.

The present disclosure further relates to one or more embodiments as follows.

<1> A cleaning composition for a glass hard disk substrate comprising: an amine (component A) expressed by the following formula (I); and a surface active agent (component B) expressed by the following formula (II), wherein

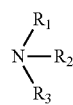
(I)

in the formula (I), $R_1$ represents a hydrogen atom, a methyl group, an ethyl group, or an aminoethyl group, $R_2$ represents a hydrogen atom, a hydroxyethyl group, a hydroxypropyl group, a methyl group, or an ethyl group, and $R_3$ represents an aminoethyl group, a hydroxyethyl group, or a hydroxypropyl group, or in the formula (I), $R_1$ represents a methyl group, an ethyl group, a hydroxyethyl group, or a hydroxypropyl group, and $R_2$ and $R_3$ are bonded to each other to form a pyrrolidine ring or a piperazine ring with a nitrogen atom in the formula (I), and wherein

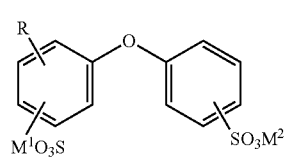
(II)

in the formula (II), R represents a linear or branched alkyl group having 6 or more and 18 or less carbon atoms, and $M^1$ and $M^2$ each independently represent a hydrogen atom, a metal atom, $NH_4$, or organic ammonium.

<2> The cleaning composition according to <1>, further comprising water (component C).

<3> The cleaning composition according to <2>, wherein a content of the component C in the cleaning composition for use in cleaning is preferably 90% by mass or more, more preferably 93% by mass or more, and further preferably 95% by mass or more and is preferably 99.9% by mass or less, more preferably 99.85% by mass or less, and further preferably 99.8% by mass or less.

<4> The cleaning composition according to any one of <1> to <3>, wherein a mass ratio A/B of the component A to the component B is 1 or more and 20 or less.

<5> The cleaning composition according to any one of <1> to <4>, wherein the mass ratio A/B of the component A to the component B is preferably 1 or more, more preferably 2.5 or more, and further preferably 5 or more and is preferably 20 or less, more preferably 16 or less, and further preferably 10 or less.

<6> The cleaning composition according to any one of <1> to <5>, wherein a content of the component A with respect to a total mass of components other than water in the cleaning composition is preferably 40% by mass or more, more preferably 45% by mass or more, and further preferably 60% by mass or more and is preferably 82% by mass or less, and more preferably 80% by mass or less.

<7> The cleaning composition according to any one of <1> to <5>, wherein a content of the component A with respect to a total mass of components other than water in the cleaning composition is preferably 40% by mass or more, more preferably 45% by mass or more, and further preferably 50% by mass or more and is preferably 90% by mass or less, more preferably 81% by mass or less, and further preferably 77% by mass or less.

<8> The cleaning composition according to any one of <1> to <7>, wherein a content of the component A in the cleaning composition for use in cleaning is preferably 0.01% by mass or more, more preferably 0.04% by mass or more, and further preferably 0.09% by mass or more and is preferably 0.22% by mass or less, more preferably 0.18% by mass or less, and further preferably 0.13% by mass or less.

<9> The cleaning composition according to any one of <1> to <8>, wherein the content of the component A in the cleaning composition for use in cleaning is preferably 0.01% by mass or more and 0.22% by mass or less, more preferably 0.04% by mass or more and 0.18% by mass or less, and further preferably 0.09% by mass or more and 0.13% by mass or less.

<10> The cleaning composition according to any one of <1> to <9>, wherein a content of the component B with respect to a total mass of components other than water in the cleaning composition is preferably 5% by mass or more, and more preferably 10% by mass or more and is preferably 40% by mass or less, and more preferably 30% by mass or less.

<11> The cleaning composition according to any one of <1> to <10>, wherein the content of the component B with respect to the total mass of the components other than water in the cleaning composition is preferably 5% by mass or more and 40% by mass or less, and more preferably 10% by mass or more and 30% by mass or less.

<12> The cleaning composition according to any one of <1> to <11>, wherein a content of the component B in the cleaning composition for use in cleaning is preferably 0.008% by mass or more, more preferably 0.01% by mass or more, and further preferably 0.02% by mass or more and is preferably 0.2% by mass or less, more preferably 0.1% by mass or less, and further preferably 0.08% by mass or less.

<13> The cleaning composition according to any one of <1> to <12>, wherein the content of the component B in the cleaning composition for use in cleaning is preferably 0.008% by mass or more and 0.2% by mass or less, more preferably 0.01% by mass or more and 0.1% by mass or less, and further preferably 0.02% by mass or more and 0.08% by mass or less.

<14> The cleaning composition according to any one of <1> to <13>, further comprising a chelating agent (component D).

<15> The cleaning composition according to <14>, wherein a content of the component D with respect to a total mass of components other than water in the cleaning composition is preferably 1% by mass or more, and more preferably 4% by mass or more and is preferably 20% by mass or less, and more preferably 15% by mass or less.

<16> The cleaning composition according to <14> or <15>, wherein the content of the component D with respect to the total mass of the components other than water in the cleaning composition is preferably 1% by mass or more and 20% by mass or less, and more preferably 4% by mass or more and 15% by mass or less.

<17> The cleaning composition according to any one of <14> to <16>, wherein a content of the component D in the cleaning composition for use in cleaning is preferably 0.005% by mass or more, more preferably 0.008% by mass or more, and further preferably 0.01% by mass or more and is preferably 1.0% by mass or less, and more preferably 0.1% by mass or less.

<18> The cleaning composition according to any one of <14> to <17>, wherein the content of the component D in the cleaning composition for use in cleaning is preferably 0.005% by mass or more and 1.0% by mass or less, more preferably 0.008% by mass or more and 0.1% by mass or less, and further preferably 0.01% by mass or more and 0.1% by mass or less.

<19> The cleaning composition according to any one of <1> to <18>, further comprising an anionic polymer (component E).

<20> The cleaning composition according to <19>, wherein a content of the component E with respect to a total mass of components other than water in the cleaning composition is preferably 1% by mass or more, more preferably 3% by mass or more, and further preferably 5% by mass or more and is preferably 20% by mass or less, more preferably 15% by mass or less, and further preferably 10% by mass or less.

<21> The cleaning composition according to <19> or <20>, wherein a content of the component E in the cleaning composition for use in cleaning is preferably 0.005% by mass or more, more preferably 0.008% by mass or more, and further preferably 0.01% by mass or more and is preferably 2% by mass or less, more preferably 1% by mass or less, and further preferably 0.5% by mass or less.

<22> The cleaning composition according to any one of <1> to <21>, wherein a concentration of alkali metal ions, i.e., a total concentration of sodium ions and potassium ions in the cleaning composition for use in cleaning is preferably 1% by mass (10000 ppm) or less, more preferably 0.1% by mass (1000 ppm) or less, and further preferably 0.01% by mass (100 ppm) or less.

<23> The cleaning composition according to any one of <1> to <22>, wherein a pH of the cleaning composition for use in cleaning is preferably 9.0 or more, more preferably 9.3 or more, and further preferably 9.5 or more and is preferably 14.0 or less, more preferably 12.0 or less, and further preferably 11.0 or less.

<24> The cleaning composition according to any one of <1> to <23>, wherein the glass hard disk substrate is a substrate for heat-assisted magnetic recording.

<25> A method for cleaning a glass hard disk substrate, comprising:
a cleaning process of cleaning a substrate to be cleaned with the cleaning composition according to any one of <1> to <24>.

<26> The method for cleaning a glass hard disk substrate according to <25>, wherein the substrate to be cleaned is a substrate that has been polished with a polishing composition.

<27> A method for producing a glass hard disk substrate, comprising: a cleaning process of cleaning a substrate to be cleaned with the cleaning composition according to any one of <1> to <24>.

<28> The method for producing a glass hard disk substrate according to <27>, wherein the substrate to be cleaned is a substrate that has been polished with a polishing composition.

<29> A method for cleaning a substrate, comprising:
a cleaning process of cleaning a substrate to be cleaned with the cleaning composition according to any one of <1> to <24>,
wherein the substrate to be cleaned is a substrate that has been polished with a polishing composition.

<30> A method for producing a glass hard disk substrate, comprising: a cleaning process of cleaning a substrate to be cleaned with the cleaning composition according to any one of <1> to <24>,
wherein the substrate to be cleaned is a substrate that has been polished with a polishing composition.

<31> Use of the cleaning composition according to any one of <1> to <24> for a glass hard disk substrate for heat-assisted magnetic recording.

<32> Use of the cleaning composition according to any one of <1> to <24> in production of a glass hard disk substrate for heat-assisted magnetic recording.

<33> Use of the cleaning composition according to any one of <1> to <24> in cleaning of a substrate that has been polished with a polishing composition.

<34> A kit for producing the cleaning composition according to any one of <1> to <24>, wherein the component A and the component B are stored so as not to be mixed with each other.

Hereinafter, the present disclosure will be described based on the following examples and comparative examples. However, the present disclosure is not limited thereto.

EXAMPLES

[Preparation of concentrated solution of cleaning composition (Examples 1 to 11 and Comparative Examples 1 to 6)]

According to each composition in Table 1, the components were mixed in the proportions (% by mass) as shown in Table 1, thereby providing concentrated solutions of cleaning compositions in Examples 1 to 11 and Comparative Examples 1 to 6. Table 1 shows the pH of each of the concentrated solutions of the cleaning compositions at 25° C. The pH was measured by a pH meter (HM-30G, manufactured by DKK-TOA CORPORATION) after a 3-minutes immersion of the electrode in the cleaning composition.

TABLE 1

| | | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Concentrated solution of cleaning composition | Amine (component A) | N-(β-aminoethyl)ethanolamine | Added amount (% by mass) | 15.00 | 10.00 | 10.00 | — | — | 5.00 | 20.00 | 15.00 |
| | | Monoisopropanolamine | Added amount (% by mass) | — | — | 5.00 | — | — | — | — | — |
| | | N-methylmonoethanolamine | Added amount (% by mass) | — | — | — | 15.00 | — | — | — | — |
| | | Diethylenetriamine | Added amount (% by mass) | — | — | — | — | 15.00 | — | — | — |
| | | Hydroxyethylpiperazine | Added amount (% by mass) | — | — | — | — | — | — | — | — |
| | | Triethanolamine (non-component A) | Added amount (% by mass) | — | — | — | — | — | — | — | — |
| | Surface active agent (component B) | Disodium dodecyl diphenyl ether disulfonate | Added amount (% by mass) | 5.65 (2.825) | 5.65 (2.825) | 5.65 (2.825) | 5.65 (2.825) | 5.65 (2.825) | 5.65 (2.825) | 5.65 (2.825) | 2.00 (1.00) |
| | | Sodium polyoxyethylene (3) lauryl ether sulfate (non-component B) | Added amount (% by mass) | | | | | | | | |
| | Water (component C) | Ultrapure water | Added amount (% by mass) | 73.85 | 78.85 | 73.85 | 73.85 | 73.85 | 83.85 | 68.85 | 77.50 |
| | Chelating agent (component D) | HEDP | Added amount (% by mass) | 2.50 (1.50) | 2.50 (1.50) | 2.50 (1.50) | 2.50 (1.50) | 2.50 (1.50) | 2.50 (1.50) | 2.50 (1.50) | 2.50 (1.50) |
| | Anionic polymer (component E) | AA/AMPS | Added amount (% by mass) | 3.00 (1.20) | 3.00 (1.20) | 3.00 (1.20) | 3.00 (1.20) | 3.00 (1.20) | 3.00 (1.20) | 3.00 (1.20) | 3.00 (1.20) |
| | Alkali metal hydroxide | Potassium hydroxide | Added amount (% by mass) | — | — | — | — | — | — | — | — |
| | | pH | | 10.9 | 10.5 | 10.8 | 11.1 | 10.3 | 10.0 | 10.9 | 10.7 |

| | | | | Ex. 9 | Ex. 10 | Ex. 11 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| Concentrated solution of cleaning composition | Amine (component A) | N-(β-aminoethyl)ethanolamine | Added amount (% by mass) | 15.00 | 15.00 | — | 15.00 | — | — | 2.00 | — | 15.00 |
| | | Monoisopropanolamine | Added amount (% by mass) | — | — | — | — | — | — | — | — | — |
| | | N-methylmonoethanolamine | Added amount (% by mass) | — | — | — | — | — | — | — | — | — |
| | | Diethylenetriamine | Added amount (% by mass) | — | — | — | — | — | — | — | — | — |
| | | Hydroxyethylpiperazine | Added amount (% by mass) | — | — | 10.00 | — | — | — | — | — | — |
| | | Triethanolamine (non-component A) | Added amount (% by mass) | — | — | — | — | — | — | — | 15.00 | — |

TABLE 1-continued

| | | | | | | | | | | | | |
|---|---|---|---|---|---|---|---|---|---|---|---|---|
| Surface active agent (component B) | Disodium dodecyl diphenyl ether disulfonate | Added amount (% by mass) | 10.00 (5.00) | 5.65 (2.825) | 5.65 (2.825) | — | 5.65 (2.825) | 5.65 (2.825) | — | 5.65 (2.825) | — |
| | Sodium polyoxyethylene (3) lauryl ether sulfate (non-component B) | Added amount (% by mass) | — | — | — | — | — | — | — | — | 11.30 (2.825) |
| Water (component C) | Ultrapure water | Added amount (% by mass) | 69.50 | 76.85 | 78.85 | 79.50 | 88.85 | 85.80 | 91.99 | 73.85 | 68.20 |
| Chelating agent (component D) | HEDP | Added amount (% by mass) | 2.50 (1.50) | 2.50 (1.50) | 2.50 (1.50) | 2.50 (1.50) | 2.50 (1.50) | 2.50 (1.50) | 2.50 (1.50) | 2.50 (1.50) | 2.50 (1.50) |
| Anionic polymer (component E) | AA/AMPS | Added amount (% by mass) | 3.00 (1.20) | — | 3.00 (1.20) | 3.00 (1.20) | 3.00 (1.20) | 3.00 (1.20) | 3.00 (1.20) | 3.00 (1.20) | 3.00 (1.20) |
| Alkali metal hydroxide | Potassium hydroxide | Added amount (% by mass) | — | — | — | — | — | 3.05 (1.464) | 0.51 (0.2448) | — | — |
| | | pH | 10.8 | 10.8 | 10.0 | 10.5 | 2.4 | 10.4 | 9.0 | 8.7 | 10.7 |

※The value in parentheses indicates a solid content (% by mass).

[Preparation of Cleaning Composition to be used in Cleaning Process (i.e., Cleaning Composition for use in Cleaning)]

The concentrated solution of the cleaning composition was diluted to 100 times with ultrapure water, so that the cleaning composition for use in cleaning was obtained. The pH was measured in the same manner as the pH of the concentrated solution of the cleaning composition.

[Measurement of Alkali Metal Ion Concentration]

The concentration of alkali metal ions in the cleaning composition was measured in the following manner. First, 0.1 g of the cleaning composition was precisely weighed in a quartz crucible and subjected to dry carbonization. Then, the cleaning composition was dissolved in 4 mL of 6N hydrochloric acid, and the volume of this solution was adjusted to 50 mL with ultrapure water. Subsequently, this solution was diluted to 25 times with ultrapure water and used as a measurement sample. The concentration of alkali metal ions in the measurement sample was measured by an atomic absorption spectrophotometer (Varian Spectra AA 220, manufactured by Agilent Technologies Japan, Ltd.). The concentration (% by mass) of sodium ions and the concentration (% by mass) of potassium ions were calculated each. Then, the total concentration (% by mass) was converted to a ppm value, which was the alkali metal ion concentration.

The following components were used to prepare the cleaning compositions.

[Amine]

N-(β-aminoethyl)ethanolamine (Amino alcohol EA, manufactured by NIPPON NYUKAZAI CO., LTD.): component A Monoisopropanolamine (manufactured by The Dow Chemical Company): component A N-methylmonoethanolamine (Amino alcohol MMA, manufactured by NIPPON NYUKAZAI CO., LTD.): component A Diethylenetriamine (manufactured by NACALAI TESQUE, INC.): component A 1-(2-hydroxyethyl)piperazine (Hydroxyethyl Piperazine, manufactured by NIPPON NYUKAZAI CO., LTD.): component A Triethanolamine (manufactured by Tokyo Chemical Industry Co., Ltd.): non-component A

[Surface Active Agent]

Disodium dodecyl diphenyl ether disulfonate (with a solid content of 50% by mass and a molecular weight of 542): component B Sodium polyoxyethylene (3) lauryl ether sulfate (EMAL 20C with a solid content of 25% by mass and a molecular weight of 420, manufactured by Kao Corporation): non-component B

[Water: Component C]

Ultrapure water produced by a continuous water purifying apparatus (Pureconti PC-2000VRL) and a subsystem (Makuace KC-05H), both of which are manufactured by Kurita Water Industries Ltd.

[Chelating Agent: Component D]

1-hydroxyethylidene-1,1-diphosphonic acid (HEDP) (Dequest 2010 with a solid content of 60% by mass, manufactured by Italmatch Japan Ltd.)

[Anionic Polymer: Component E]

An aqueous solution (with a solid content of 40% by mass) of sodium salt of a copolymer compound (with a weight average molecular weight of 12,000) of acrylic acid and 2-acrylamide-2-methylpropanesulfonic acid (AA/AMPS) (molar ratio: 92/8)

[Alkali Metal Hydroxide]

Potassium hydroxide (with a solid content of 48% by mass, guaranteed reagent, manufactured by KANTO CHEMICAL CO., INC.)

[Detergency Test Method]

A substrate was polished with a polishing liquid slurry (polishing composition) having the following composition. Then, the substrate that was contaminated by, e.g., abrasive grains derived from the polishing liquid slurry and polishing debris derived from the substrate material was prepared as a substrate to be cleaned. Using the substrate to be cleaned, the detergency of the cleaning composition was evaluated.

(Substrate for Evaluation)

Heat-resistant amorphous glass substrates (with an outer diameter of 65 mmφ, an inner diameter of 20 mmφ, and a thickness of 0.635 mm) were prepared as substrates for evaluation in Examples 1 to 11 and Comparative Examples 1 to 6.

(Polishing Condition)

Polishing machine: double side 9B polisher (manufactured by HAMAI CO., LTD.)

Polishing pad: suede pad for final polishing (manufactured by FILWEL CO., LTD.)

Polishing composition: colloidal silica slurry (in which the number average particle diameter of colloidal silica particles was 24 nm, the concentration of colloidal silica particles was 8% by mass, and the medium was water, manufactured by Kao Corporation)

Pre-polishing: the load was 40 g/cm$^2$, the time was 60 sec, and the flow rate of a polishing liquid was 100 mL/min.

Main polishing: the load was 100 g/cm$^2$, the time was 1200 sec, and the flow rate of a polishing liquid was 100 mL/min.

Water rinsing: the load was 40 g/cm$^2$, the time was 60 sec, and the flow rate of water for rinsing was about 2 L/min.

(Cleaning)

Five substrates after polishing (i.e., the substrates to be cleaned) were cleaned by a cleaning apparatus under the following conditions. Two sets of a cleaning tank and a rinsing tank were prepared.

(1) Cleaning-1: 150 g of a concentrated solution of a cleaning composition was diluted to 100 times with ultrapure water to prepare 15000 g of the cleaning composition that was to be used for cleaning. The cleaning composition thus prepared was placed in a cleaning tank (a), and the temperature of the liquid in the cleaning tank (a) was set to 40° C. Then, the substrate to be cleaned was immersed in the cleaning composition in the cleaning tank (a), and cleaned for 120 seconds while ultrasonic waves (40 kHz) was being applied.

(2) Rinsing-1: Ultrapure water was placed in a rinsing tank (b), and the temperature of the liquid in the rinsing tank (b) was set to 40° C. Then, the substrate to be cleaned was transferred from the cleaning tank (a) to the rinsing tank (b), immersed in the ultrapure water in the rinsing tank (b), and rinsed for 120 seconds while ultrasonic waves (40 kHz) was being applied.

(3) Using a cleaning tank (c) containing a cleaning composition that was prepared under the same conditions as the cleaning tank (a) and a rinsing tank (d) containing ultrapure water that was prepared under the same conditions as the rinsing tank (b), the steps (1) and (2) were repeated again.

(4) Cleaning-2: The substrate to be cleaned in the rinsing tank (d) was transferred to a scrub cleaning unit (A) in which cleaning brushes were mounted. Then, a cleaning composition of 25° C. was injected into each of the cleaning brushes, and the cleaning brushes were pressed against both surfaces of the substrate in the presence of the cleaning composition while rotating the cleaning brushes at 400 rpm so that the substrate was cleaned at 25° C. for 5 seconds. The cleaning composition had the same composition as that of the cleaning composition used in the "cleaning-1" of the step (1).

(5) Rinsing-2: The substrate to be cleaned was transferred to a scrub cleaning unit (B) that was prepared under the same conditions as the scrub cleaning unit (A). Then, ultrapure water of 25° C. was injected, and the cleaning brushes were pressed against both surfaces of the substrate while rotating the cleaning brushes at 400 rpm in the same manner as the step (4) so that the substrate was rinsed at 25° C. for 5 seconds.

(6) A scrub cleaning unit (C) was prepared under the same conditions as the scrub cleaning unit (A), and a scrub cleaning unit (D) was prepared under the same conditions as the scrub cleaning unit (B). Using the scrub cleaning units (C) and (D), the steps (4) and (5) were repeated again.

(7) Rinsing-3: Ultrapure water was placed in a rinsing tank (e), and the temperature of the liquid in the rinsing tank (e) was set to 25° C. Then, the substrate to be cleaned was transferred to the rinsing tank (e), immersed in the ultrapure water in the rinsing tank (e), and rinsed for 600 seconds while ultrasonic waves (170 kHz) was being applied.

(8) Drying: The substrate to be cleaned was transferred to a rising tank (f) containing hot pure water of 30° C. and immersed in the hot pure water in the rinsing tank (f) for 60 seconds. Then, the substrate was drawn up from the water at a rate of 90 mm/min, and the surface of the substrate was completely dried.

[Method for Evaluating Detergency]

The cleaned substrate was rotated at 10000 rpm and irradiated with a laser using MODE Q-Scatter of an optical microdefect inspection apparatus (Candela 6100, manufactured by KLA-Tencor Corporation) to measure the number of defects (i.e., the number of foreign matter on the substrate). This measurement was performed on 10 substrates for each of the cleaning compositions in Examples 1 to 11 and Comparative Examples 1 to 6, and the average of the measured values was calculated. Table 2 shows the relative values when the value of Example 1 is defined as 100. As shown in Table 2, it can be evaluated that the detergency is better as the relative value is smaller, since the number of defects is reduced.

[Method for Evaluating Surface Roughness]

Two substrates were randomly selected from five substrates that had been polished by the same polishing method, as described above. Then, the two substrates were cleaned with the cleaning compositions in Examples 1 to 11 and Comparative Examples 1 to 6, and the surface roughness of each of the substrates was measured. The results of this measurement were represented by "surface roughness 1." Moreover, the surface roughness was measured in the same manner, except that the immersion time was changed from 120 seconds to 60 minutes in the step (1), and the step (3) was skipped (i.e., the step (1) and the step (2) were each performed only once). The results of this measurement were represented by "surface roughness 2." To determine the surface roughness, both surfaces of the cleaned substrate were measured by an atomic force microscope (AFM) (Digital Instrument Nano Scope IIIa Multimode AFM, manufactured by Bruker AXS K.K.) under the following conditions. Each of the five substrates was measured to obtain the average value, from which the surface roughness Ra was calculated. Table 2 shows the relative values of the surface roughness 1 and the surface roughness 2 when the values of Example 1 are defined as 100, respectively. As shown in Table 2, it can be evaluated that the smoothness is better as the relative value is smaller.

(AFM Measurement Condition)

Mode: Tapping Mode

Area: 1×1 μm

Scan rate: 1.0 Hz

Cantilever: NCH-10V

Line: 512×512

Table 2 shows the content of each component with respect to the total mass of the components other than water in the cleaning composition, the physical properties (dilution ratio, pH, and alkali metal ion concentration) of the cleaning composition for use in cleaning, and the evaluation results of the detergency and the smoothness in Examples 1 to 11 and Comparative Examples 1 to 6.

TABLE 2

| | | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Cleaning composition | Amine (component A) | N-(β-aminoethyl)ethanolamine | Content with respect to total mass of components other than water (% by mass) | 73.08 | 64.41 | 48.72 | — | — | 47.51 | 78.35 | 80.21 |
| | | Monoisopropanolamine | Content with respect to total mass of components other than water (% by mass) | — | 24.36 | — | — | — | — | — | — |
| | | N-methylmonoethanolamine | Content with respect to total mass of components other than water (% by mass) | — | — | — | 73.08 | — | — | — | — |
| | | Diethylenetriamine | Content with respect to total mass of components other than water (% by mass) | — | — | — | — | 73.08 | — | — | — |
| | | Hydroxyethylpiperazine | Content with respect to total mass of components othert han water (% by mass) | | | | | | | | |
| | | Triethanolamine (non-component A) | Content with respect to total mass of components other than water (% by mass) | — | — | — | — | — | — | — | — |
| | Surface active agent (component B) | Disodium dodecyl diphenyl ether disulfonate | Content with respect to total mass of components other than water (% by mass) | 13.76 | 18.20 | 13.76 | 13.76 | 13.76 | 26.84 | 11.07 | 5.35 |
| | | Sodium polyoxyethylene (3) lauryl ether sulfate (non-component B) | Content with respect to total mass of components other than water (% by mass) | | | | | | | | |
| | Chelating agent (component D) | HEDP | Content with respect to total mass of components other than water (% by mass) | 7.31 | 9.66 | 7.31 | 7.31 | 7.31 | 14.25 | 5.88 | 8.02 |
| | Anionic polymer (component E) | AA/AMPS | Content with respect to total mass of components other than water (% by mass) | 5.85 | 7.73 | 5.85 | 5.85 | 5.85 | 11.40 | 4.70 | 6.42 |
| | Alkali metal hydroxide | Potassium hydroxide | Content with respect to total mass of components other than water (% by mass) | | | | | | | | |
| | | Mass ratio A/B | | 5.31 | 3.54 | 5.31 | 5.31 | 5.31 | 1.77 | 7.08 | 15.00 |
| Cleaning composition to be used in cleaning process | | Dilution ratio (times) | | 100 | 100 | 100 | 100 | 100 | 100 | 100 | 100 |
| | | pH | | 10.5 | 10.4 | 10.8 | 10.4 | 10.4 | 9.8 | 10.5 | 10.4 |
| | | Alkali metal ion concentration (ppm) | | 50 | 50 | 50 | 50 | 50 | 50 | 50 | 34 |

TABLE 2-continued

| Evaluation | Detergency | Number of defects | 100 | 102 | 100 | 90 | 80 | 105 | 95 | 105 |
|---|---|---|---|---|---|---|---|---|---|---|
| | Smoothness | Surface roughness 1 | 100 | 100 | 103 | 110 | 110 | 100 | 105 | 100 |
| | | Surface roughness 2 | 107 | 107 | 110 | 118 | 118 | 107 | 112 | 107 |

| | | | | Ex. 9 | Ex. 10 | Ex. 11 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| Cleaning composition | Amine (component A) | N-(β-aminoethyl)ethanolamine | Content with respect to total mass of components other than water (% by mass) | 66.08 | 77.62 | — | 84.75 | — | — | 40.45 | — | 73.08 |
| | | Monoisopropanolamine | Content with respect to total mass of components other than water (% by mass) | — | — | — | — | — | — | — | — | — |
| | | N-methylmonoethanolamine | Content with respect to total mass of components other than water (% by mass) | — | — | — | — | — | — | — | — | — |
| | | Diethylenetriamine | Content with respect to total mass of components other than water (% by mass) | — | — | — | — | — | — | — | — | — |
| | | Hydroxyethylpiperazine | Content with respect to total mass of components other than water (% by mass) | — | — | 64.41 | — | — | — | — | — | — |
| | | Triethanolamine (non-component A) | Content with respect to total mass of components other than water (% by mass) | — | — | — | — | — | — | — | 73.08 | — |
| | Surface active agent (component B) | Disodium dodecyl diphenyl ether disulfonate | Content with respect to total mass of components other than water (% by mass) | 22.03 | 14.62 | 18.20 | — | 51.13 | 40.42 | — | 13.76 | — |
| | | Sodium polyoxyethylene (3) lauryl ether sulfate (non-component B) | Content with respect to total mass of components other than water (% by mass) | — | — | — | — | — | — | — | — | 13.76 |
| | Chelating agent (component D) | HEDP | Content with respect to total mass of components other than water (% by mass) | 6.61 | 7.76 | 9.66 | 8.47 | 27.15 | 21.46 | 30.33 | 7.31 | 7.31 |
| | Anionic polymer (component E) | AA/AMPS | Content with respect to total mass of components other than water (% by mass) | 5.29 | — | 7.73 | 6.78 | 21.72 | 17.17 | 24.27 | 5.85 | 5.85 |
| | Alkali metal hydroxide | Potassium hydroxide | Content with respect to total mass of components other than water (% by mass) | — | — | — | — | — | 20.95 | 4.95 | — | — |
| | | Mass ratio A/B | | 3.00 | 5.31 | 3.54 | 0 | 0 | 0 | 0 | 0 | 0 |

TABLE 2-continued

| Cleaning composition to be used in cleaning process | | Dilution ratio (times) | 10.4 | 10.4 | 9.5 | 10.5 | 3.5 | 10.6 | 9.0 | 8.5 | 10.4 |
|---|---|---|---|---|---|---|---|---|---|---|---|
| | | pH | 68 | 10 | 50 | 26 | 50 | 266 | 62 | 50 | 50 |
| | | Alkali metal ion concentration (ppm) | | | | | | | | | |
| Evaluation | Detergency | Number of defects | 100 | 103 | 105 | 129 | 232 | 161 | 126 | 105 | 130 |
| | Smoothness | Surface roughness 1 | 100 | 100 | 100 | 106 | 105 | 110 | 107 | 110 | 105 |
| | | Surface roughness 2 | 107 | 107 | 107 | 113 | 112 | 154 | 139 | 118 | 112 |

As shown in Table 2, the use of the cleaning compositions in Examples 1 to 11 can achieve higher detergency and higher smoothness than the use of the cleaning compositions in Comparative Examples 1 to 6.

The invention claimed is:

1. A method for cleaning a glass substrate, comprising:
a cleaning process of cleaning a substrate to be cleaned with a cleaning composition, the cleaning composition comprising:
an amine (component A) expressed by the following formula (I); and
a surface active agent (component B) expressed by the following formula (II),
wherein

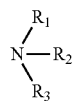  (I)

in the formula (I), $R_1$ represents a hydrogen atom, a methyl group, an ethyl group, or an aminoethyl group, $R_2$ represents a hydrogen atom, a hydroxyethyl group, a hydroxypropyl group, a methyl group, or an ethyl group, and $R_3$ represents an aminoethyl group, a hydroxyethyl group, or a hydroxypropyl group, or in the formula (I), $R_1$ represents a methyl group, an ethyl group, an aminoethyl group, a hydroxyethyl group, or a hydroxypropyl group, and $R_2$ and $R_3$ are bonded to each other to form a pyrrolidine ring or a piperazine ring with a nitrogen atom in the formula (I), and
wherein

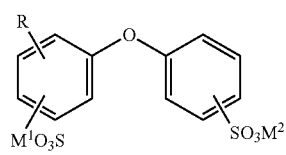  (II)

in the formula (II), R represents a linear or branched alkyl group having 6 or more and 18 or less carbon atoms, and $M^1$ and $M^2$ each independently represent a hydrogen atom, a metal atom, $NH_4$, or organic ammonium, and
wherein a content of component A in the cleaning composition is 0.01% by mass or more and 0.28% by mass or less.

2. The method for cleaning a glass substrate according to claim 1, wherein the substrate to be cleaned is a substrate that has been polished with a polishing composition.

3. The method for cleaning a glass substrate according to claim 1, wherein the cleaning composition further comprises water (component C).

4. The method for cleaning a glass substrate according to claim 1, wherein a mass ratio A/B of the component A to the component B in the cleaning composition is 1 or more and 20 or less.

5. The method for cleaning a glass substrate according to claim 1, wherein a content of the component A with respect to a total mass of components other than water in the cleaning composition is 40% by mass or more and 90% by mass or less.

6. The method for cleaning a glass substrate according to claim 1, wherein a content of the component A in the cleaning composition is 0.01% by mass or more and 0.22% by mass or less, and a content of the component B in the cleaning composition is 0.008% by mass or more and 0.2% by mass or less.

7. The method for cleaning a glass substrate according to claim 1, wherein the cleaning composition further comprises a chelating agent (component D).

8. The method for cleaning a glass substrate according to claim 1,
wherein the cleaning composition further comprises an anionic polymer (component E).

9. The method for cleaning a glass substrate according to claim 1, wherein the cleaning composition is prepared by using a kit in which the component A and the component B are stored so as not to be mixed with each other.

10. A method for producing a glass hard disk substrate, comprising:
(1) a polishing process of polishing a substrate to be polished with a polishing composition; and
(2) a cleaning process of cleaning a substrate to be cleaned with a cleaning composition, the cleaning composition comprising:
an amine (component A) expressed by the following formula (I); and
a surface active agent (component B) expressed by the following formula (II),
wherein

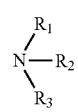  (I)

in the formula (I), R represents a hydrogen atom, a methyl group, an ethyl group, or an aminoethyl group, $R_2$ represents a hydrogen atom, a hydroxyethyl group, a hydroxypropyl group, a methyl group, or an ethyl group, and $R_3$ represents an aminoethyl group, a hydroxyethyl group, or a hydroxypropyl group, or in the formula (I), $R_1$ represents a methyl group, an ethyl group, an aminoethyl group, a hydroxyethyl group, or a hydroxypropyl group, and $R_2$ and $R_3$ are bonded to each other to form a pyrrolidine ring or a piperazine ring with a nitrogen atom in the formula (I), and wherein

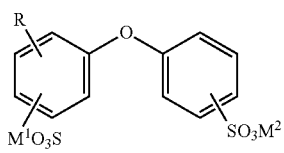

(II)

in the formula (II), R represents a linear or branched alkyl group having 6 or more and 18 or less carbon atoms, and $M^1$ and $M^2$ each independently represent a hydrogen atom, a metal atom, $NH_4$, or organic ammonium, and wherein a content of the component A in the cleaning composition is 0.01% by mass or more and 0.22% by mass or less, and a content of the component B in the cleaning composition is 0.008% by mass or more and 0.2% by mass or less.

11. The method for producing a glass hard disk substrate according to claim 10, wherein the substrate to be cleaned is a substrate that has been polished with a polishing composition.

12. The method for producing a glass hard disk substrate according to claim 10, wherein the cleaning composition further comprises water (component C).

13. The method for producing a glass hard disk substrate according to claim 10, wherein a mass ratio A/B of the component A to the component B in the cleaning composition is 1 or more and 20 or less.

14. The method for producing a glass hard disk substrate according to claim 10, wherein a content of the component A with respect to a total mass of components other than water in the cleaning composition is 40% by mass or more and 90% by mass or less.

15. The method for producing a glass hard disk substrate according to claim 10, wherein a content of the component A in the cleaning composition is 0.01% by mass or more and 0.28% by mass or less.

16. The method for producing a glass hard disk substrate according to claim 10, wherein the glass hard disk substrate is a substrate for heat-assisted magnetic recording.

17. The method for producing a glass hard disk substrate according to claim 10, wherein the cleaning composition is prepared by using a kit in which the component A and the component B are stored so as not to be mixed with each other.

18. A method for cleaning a glass substrate, comprising:
a cleaning process of cleaning a substrate to be cleaned with a cleaning composition, the cleaning composition comprising:
an amine (component A) expressed by the following formula (I); and
a surface active agent (component B) expressed by the following formula (II), wherein

in the formula (I), $R_1$ represents a hydrogen atom, a methyl group, an ethyl group, or an aminoethyl group, $R_2$ represents a hydrogen atom, a hydroxyethyl group, a hydroxypropyl group, a methyl group, or an ethyl group, and $R_3$ represents an aminoethyl group, a hydroxyethyl group, or a hydroxypropyl group, or in the formula (I), $R_1$ represents a methyl group, an ethyl group, an aminoethyl group, a hydroxyethyl group, or a hydroxypropyl group, and $R_2$ and $R_3$ are bonded to each other to form a pyrrolidine ring or a piperazine ring with a nitrogen atom in the formula (I), and wherein

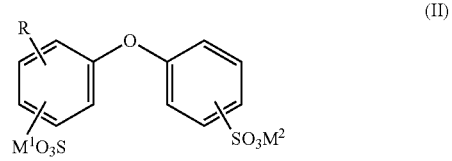

in the formula (II), R represents a linear or branched alkyl group having 6 or more and 18 or less carbon atoms, and $M^1$ and $M^2$ each independently represent a hydrogen atom, a metal atom, $NH_4$, or organic ammonium, and wherein the cleaning composition further comprises an anionic polymer (component E).

19. A method for producing a glass hard disk substrate, comprising:
(1) a polishing process of polishing a substrate to be polished with a polishing composition; and
(2) a cleaning process of cleaning a substrate to be cleaned with a cleaning composition, the cleaning composition comprising:
an amine (component A) expressed by the following formula (I); and
a surface active agent (component B) expressed by the following formula (II), wherein

in the formula (I), $R_1$ represents a hydrogen atom, a methyl group, an ethyl group, or an aminoethyl group, $R_2$ represents a hydrogen atom, a hydroxyethyl group, a hydroxypropyl group, a methyl group, or an ethyl group, and $R_3$ represents an aminoethyl group, a hydroxyethyl group, or a hydroxypropyl group, or in the formula (I), $R_1$ represents a methyl group, an ethyl group, an aminoethyl group, a hydroxyethyl group, or a hydroxypropyl group, and $R_2$ and $R_3$ are bonded to each other to form a pyrrolidine ring or a piperazine ring with a nitrogen atom in the formula (I), and wherein

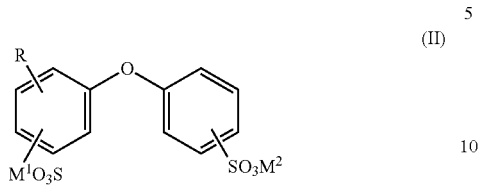

(II)

in the formula (II), R represents a linear or branched alkyl group having 6 or more and 18 or less carbon atoms, and $M^1$ and $M^2$ each independently represent a hydrogen atom, a metal atom, $NH_4$, or organic ammonium, and wherein the glass hard disk substrate is a substrate for heat-assisted magnetic recording.

* * * * *